(12) United States Patent
Togou et al.

(10) Patent No.: US 7,901,602 B2
(45) Date of Patent: Mar. 8, 2011

(54) EXPANDABLE STYRENE-MODIFIED OLEFIN RESIN PARTICLE, PRE-EXPANDED PARTICLE, AND PROCESS FOR PRODUCING MOLDED FOAM

(75) Inventors: Narihiko Togou, Shiga (JP); Masaya Satou, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 887 days.

(21) Appl. No.: 10/541,589

(22) PCT Filed: Mar. 22, 2004

(86) PCT No.: PCT/JP2004/003844
§ 371 (c)(1),
(2), (4) Date: Jul. 7, 2005

(87) PCT Pub. No.: WO2004/090029
PCT Pub. Date: Oct. 21, 2004

(65) Prior Publication Data
US 2006/0038311 A1 Feb. 23, 2006

(30) Foreign Application Priority Data

Apr. 4, 2003 (JP) ................................ 2003-101557

(51) Int. Cl.
*B29C 44/02* (2006.01)
(52) U.S. Cl. ............................................ 264/48; 264/55
(58) Field of Classification Search ..................... 264/41, 264/42, 48; 521/56, 60, 57
See application file for complete search history.

(56) References Cited

U.S. PATENT DOCUMENTS

| 3,900,433 A | * | 8/1975 | Taub et al. ...................... 521/60 |
| 4,438,058 A | * | 3/1984 | Tanaka ............................ 521/57 |
| 4,599,366 A | * | 7/1986 | Kesling et al. .................. 521/57 |
| 5,460,818 A | * | 10/1995 | Park et al. ...................... 426/415 |
| 5,563,178 A | * | 10/1996 | Henn et al. ...................... 521/56 |
| 6,057,376 A | * | 5/2000 | Bass et al. ........................ 521/64 |
| 2001/0034390 A1 | * | 10/2001 | Okubo et al. .................. 524/157 |

FOREIGN PATENT DOCUMENTS

| JP | 51-46138 | 12/1976 |
| JP | 58-152027 | 9/1983 |
| JP | 58-176227 | 10/1983 |
| JP | 59-3487 | 1/1984 |

(Continued)

OTHER PUBLICATIONS

Modern Plastics; Harper, Charles A. Modern Plastics Handbook. McGraw-Hill. Online version available at: http://knovel.com/web/portal/browse/display?_EXT_KNOVEL_DISPLAY_bookid=1008&VerticalID=0.*

(Continued)

*Primary Examiner* — Christina Johnson
*Assistant Examiner* — Galen Hauth
(74) *Attorney, Agent, or Firm* — Greenblum & Bernstein, P.L.C.

(57) ABSTRACT

According to the present invention, there is provided a method for producing expandable styrene-modified olefin-based resin particles comprising steps of: impregnating styrene-modified olefin-based resin particles with an easily volatile blowing agent to obtain expandable resin particles, and impregnating 100 parts by weight of the expandable resin particles with 0.1 to 2.0 parts by weight of a surfactant at a temperature of 10 to 30° C. and at a pressure of 0.05 to 0.30 MPa, to obtain expandable styrene-modified olefin-based resin particles.

9 Claims, 1 Drawing Sheet

FOREIGN PATENT DOCUMENTS

| | | |
|---|---|---|
| JP | 59-35923 | 8/1984 |
| JP | 60-23782 | 6/1985 |
| JP | 63-125537 | 5/1988 |
| JP | 63-28443 | 6/1988 |
| JP | 5-239253 | 9/1993 |
| JP | 10-130421 | 5/1998 |
| JP | 10-147660 | 6/1998 |
| JP | 3135238 | 12/2000 |

OTHER PUBLICATIONS

English Language abstract of JP 5-239253.
English Language abstract of JP 58-152027.
English Language abstract of JP 10-130421.
English Language abstract of JP 63-125537.
English Language abstract of JP 58-176227.
English Language abstract of JP 10-147660.

* cited by examiner

EXPANDABLE STYRENE-MODIFIED OLEFIN RESIN PARTICLE, PRE-EXPANDED PARTICLE, AND PROCESS FOR PRODUCING MOLDED FOAM

TECHNICAL FIELD

The present invention relates to expandable styrene-modified olefin-based resin particles, pre-expanded particles and a method for producing an expanded molded article.

BACKGROUND ART

An expanded molded article of styrene-modified olefin-based resin beads has been widely utilized as a goods-delivery box of mechanical parts such as an automobile part and the like, or a buffering packaging material of an electric product and the like, due to its excellent impact resistance, wear resistance and oil resistance.

However, since a styrene-modified olefin-based resin has high electric insulating property, the resin is easily electrified by friction, and appearance of an expanded molded article is deteriorated by dust attachment. In addition, since pollution or electrostatic breakage due to dust collection is caused in a content, there is a problem for using a packaging material of an electronic part as a liquid crystal display.

For the purpose of electrification prevention, there are known a method of covering surfaces of resin beads with an antistatic agent, and impregnating them with a blowing agent (Japanese Unexamined Patent Publication No. SHO 63(1988)-125537), a method of covering surfaces of expandable styrene-based resin beads with a particular antistatic agent (Japanese Examined Patent Publication No. SHO 59(1984)-35923), a method of covering surfaces of molding pre-expanded beads with an antistatic agent, and obtaining a molded article (Japanese Unexamined Patent Publication No. SHO 58(1983)-176227), and a method of modifying an olefin-based resin with a particular hydrophilic monomer, and making a surfactant contained therein (Japanese Unexamined Patent Publication No. HEI 10(1998)-147660).

However, in the aforementioned method of covering surfaces of resin beads with the antistatic agent, and impregnating them with the blowing agent as disclosed in Japanese Unexamined Patent Publication No. SHO 63(1988)425537, there is a problem that a dispersion system of the blowing agent at impregnation becomes unstable, so that binding of resin particles is easily caused.

In addition, in the aforementioned method of covering surfaces of expandable styrene-based resin beads with the particular antistatic agent as disclosed in Japanese Examined Patent Publication No. SHO 59(1984)-35923, there are problems that an addition amount of the antistatic agent for exerting antistatic property is increased, flowability of pre-expanded beads after completion of pre-expansion is deteriorated, and filling into an interior of a mold becomes insufficient at formation of an expanded article.

Further, in the aforementioned method of covering surfaces of molding pre-expanded beads with the antistatic agent, and obtaining the molded article as disclosed in Japanese Unexamined Patent Publication No. SHO 58(1983)-176227, there is a problem that the number of steps in a molding maker is increased.

Furthermore, in the aforementioned method of modifying the olefin-based resin with the particular hydrophilic monomer, and making the surfactant contained therein as disclosed in Japanese Unexamined Patent Publication No. HEI 10(1998)-147660, an expanded molded article which is excellent in antistatic property, and immediately exhibits electrostatic effect even by cracking, breakage or water washing can be obtained; however, there is a problem that since a polymerization rate of the hydrophilic monomer is worse and the monomer is expensive, a cost is increased.

DISCLOSURE OF THE INVENTION

In order to solve these problems, the present inventors continued to study and, as a result, found out that, by impregnating styrene-modified olefin-based resin particles with an easily volatile blowing agent, and impregnating them with a surfactant by mixing under pressure, expandable resin particles excellent in antistatic property can be obtained, which resulted in the present invention.

Thus, according to the present invention, there is provided a method for producing expandable styrene-modified olefin-based resin particles comprising steps of:

impregnating styrene-modified olefin-based resin particles with an easily volatile blowing agent to obtain expandable resin particles, and impregnating 100 parts by weight of the expandable resin particles—with 0.1 to 2.0 parts by weight of a surfactant at a temperature of 10 to 30° C. and a pressure of 0.05 to 0.30 MPa, to obtain expandable styrene-modified olefin-based resin particles.

According to the present invention, there is also provided a method for producing pre-expanded particles comprising step of:

pre-expanding the expandable styrene-modified olefin-based resin particles obtained by the aforementioned method by heating with water steam at a gauge pressure of 0.01 to 0.10 MPa, to obtain pre-expanded particles.

According to the present invention, there is also provided a method for producing expanded molded particles comprising step of:

expanding-molding the pre-expanded particles obtained by the aforementioned method by heating with water steam at a gauge pressure of 0.05 to 0.15 MPa, to obtain an expanded molded article.

BEST MODE FOR CARRYING OUT THE INVENTION

Figure 1:
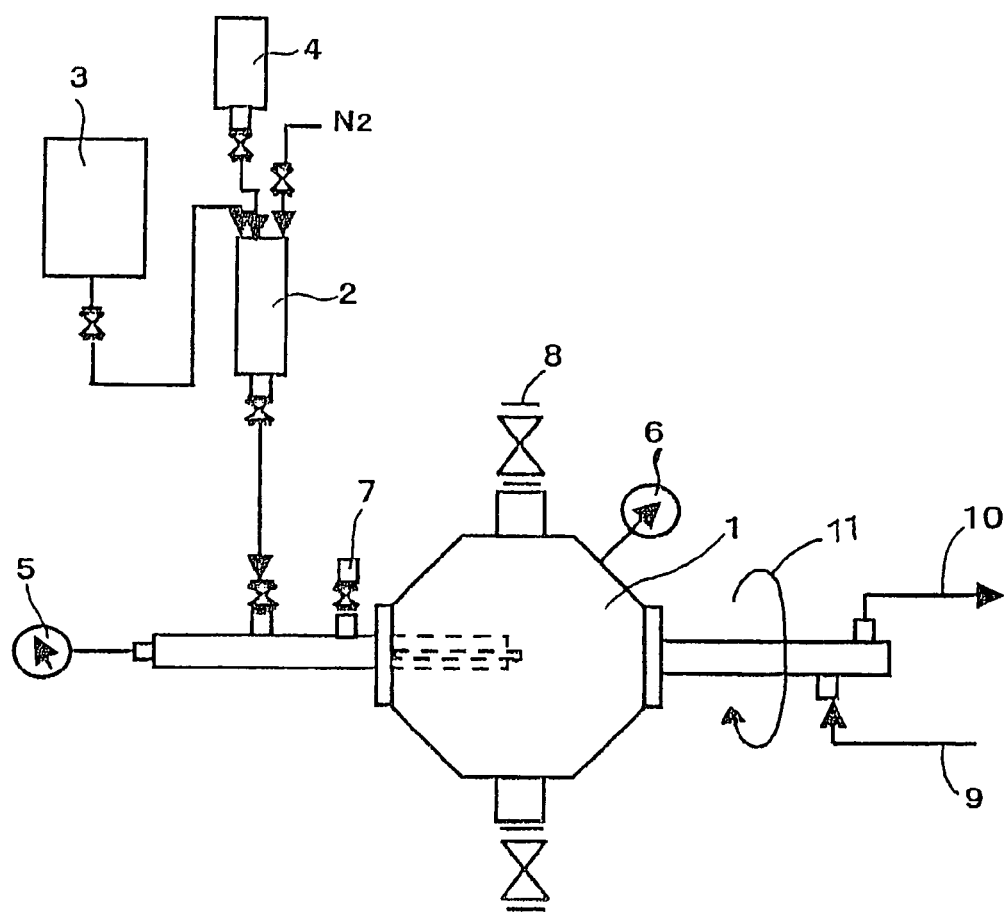
FIG. 1 is a schematic diagram of an apparatus for producing expandable resin particles according to Examples and Comparative Examples.

The present invention has a feature in that expandable resin particles impregnated with an easily volatile blowing agent are impregnated with a surfactant under pressure.

Since the surfactant can be present at a high concentration near surfaces of the expandable resin particles by this process, excellent antistatic effect can be given to the expandable resin particles.

Further, since the surfactant is adhered firmly to the expandable resin particles by collision among those particles at mixing and, further, a part of the surfactant is permeated into interiors of the resin particles, the antistatic effect can be maintained even when the resin particles are washed with water.

In addition, even when the resin particles are expansion-molded, since the surfactant is present in an interior of a molded article, a cross-section of the molded article also can exert antistatic effect. Herein, the case where expandable resin particles, pre-expanded particles and a molded article have a surface specific resistance (antistatic level) of $1\times10^{12}\Omega$ or less is determined that they have antistatic property.

In addition, when the easily volatile blowing agent is impregnated after the surfactant and the expandable resin particles are mixed, the surfactant is absorbed in the interiors of the expandable resin particles and an amount of the surfactant present on the surfaces of the expandable resin particles is decreased. Therefore, the surfactant at an amount exceeding 3 parts by weight relative to 100 parts by weight of the expandable resin particles is necessary in order to realize the aforementioned antistatic level.

Like this, when a large amount of the surfactant is used, the surfactant is foamed at removal of the expandable resin particles thereby the particles is sticky. Therefore, it becomes difficult to take out those particles, and this adversely influences on moldability in some cases. For this reason, productivity is reduced in some cases.

Hereinafter, the present invention will be described in more detail.

Styrene-modified olefin-based resin particles used in the present invention mean resin particles obtained by modifying a polyolefin-based resin with a polystyrene-based resin. Herein, modification means simple impregnation of polyolefin-based resin particles with a styrene-based monomer and polymerization of this, impregnation of polyolefin-based resin particles with a styrene-based monomer and graft polymerization of this, and both of them.

Examples of the polystyrene-based resin include resins derived from a monomer, such as styrene, α-methylstyrene, vinyltoluene and chlorostyrene.

Examples of the polyolefin-based resin include polyethylene-based resins such as low-density polyethylene, medium-density polyethylene, high-density polyethylene, linear low-density polyethylene, ethylene-vinyl acetate copolymer and ethylene-methyl methacrylate copolymer; polypropylene-based resins such as polypropylene, propylene-ethylene copolymer and propylene-1-butene-copolymer; and resins obtained by crosslinking these polymers. Among these polyolefin-based resins, the polyethylene-based resin is preferable.

In addition, other resins may be used jointly in such a range that the object and the effect of the present invention are not inhibited.

An amount of the polystyrene-based resin is preferably in a ratio of 25 to 500 parts by weight, more preferably 50 to 400 parts by weight, further preferably 100 to 250 parts by weight relative to 100 parts by weight of the polyolefin-based resin. The amount less than 25 parts by weight is not preferable, since a property that rigidity of a polystyrene-based resin component is better is exhibited with difficulty. In addition, since retainability of the easily volatile blowing agent becomes extremely worse, it is difficult to decrease a density, and expansion moldability becomes deficient, being not preferable. The amount of more than 500 parts by weight is not preferable, since a property that elasticity of a polyolefin-based resin component is high and oil resistance and impact resistance are better is exhibited with difficulty. In this case, since styrene is not sufficiently absorbed into an interior of the polyolefin-based resin component and styrene alone is polymerized, a large amount of a polymerizable powder is generated in some cases, being not preferable.

Styrene-modified polyolefin-based resin particles are obtained by adding a styrene-based monomer to an aqueous medium in which polyolefin-based resin particles are dispersed and retained, and polymerizing this, as described in, for example, Japanese Examined Patent Publication No. SHO 51(1976)-46138, Japanese Examined Patent Publication No. SHO 59(1984)-3487 and Japanese Examined Patent Publication No. SHO 63(1988)-28443.

Hereinafter, the present invention will be described more specifically.

First, in the polyolefin-based resin particles, the shape thereof is not particularly limited. However, considering a filling property into a mold, a cylindrical or approximately spherical shape is preferable. In particular, an average particle diameter of the polyolefin-based resin particles is preferably 0.2 to 1.5 mm. The average particle diameter of less than 0.2 mm is not preferable, since retainability of the blowing agent is reduced; therefore, it becomes difficult to realize a low density. In contrast, the average particle diameter of more than 1.5 mm is not preferable, since not only filling property is deteriorated, but also thinning of the molded article becomes difficult.

Modification of the polyolefin-based resin particles is performed in an aqueous suspension. Examples of an aqueous medium constituting the aqueous suspension include water, and a mixed medium of water and a water-soluble solvent (e.g., lower alcohol). In the case of this mixed medium, a medium obtained by mixing about 50% by weight of a water-soluble solvent into water may be used.

For dispersing and retaining the polyolefin-based resin particles in the aqueous medium, a dispersant can be used. The dispersant is not particularly limited, but any of the known dispersants can be used. Specific examples thereof include hardly soluble inorganic substances such as calcium phosphate, magnesium pyrophosphate and magnesium oxide.

By impregnating the polyolefin-based resin particles in the aqueous suspension with the styrene-based monomer and polymerizing this, the polyolefin-based resin particles are modified. A polymerization initiator can be used for polymerization of the styrene-based monomer. As the polymerization initiator, polymerization initiators which are generally used as a suspension polymerization initiator for the styrene-based monomer can be used.

That is, the styrene-based monomer in which the polymerization initiator is dissolved is gradually added to the aqueous suspension of the polyolefin-based resin particles, and polymerization is performed at 80 to 100° C. for 3 to 5 hours. It is more preferable that remaining styrene-based monomer is reduced and shrinkage of an expanded molded article is suppressed by raising a temperature to 130 to 140° C. after the polymerization and retaining the temperature for 1 to 3 hours.

Examples of these include organic peroxides such as benzoyl peroxide, t-butyl peroxide, t-butyl peroxybenzoate, dicumyl peroxide, 2,5-dimethyl-2,5-di-t-butyl peroxyhexane, t-butylperoxy-3,5,5-trimethyl hexanoate and t-butylperoxy-2-ethylhexyl carbonate. These polymerization initiators may be used alone, or two or more may be used jointly.

An amount of the polymerization initiator to be used is preferably 0.1 to 0.9 parts by weight relative to 100 parts by weight of the styrene-based monomer. The amount of less than 0.1 parts by weight is not preferable, since polymerization of a styrene-based monomer easily becomes insufficient, and a large amount of the styrene-based monomer remains in the polyolefin-based resin particles, therefore shrinkage at molding easily occurs. Use of the polymerization initiator at an amount exceeding 0.9 parts by weight may reduce a molecular weight of a polystyrene-based resin. In order to obtain better physical property, a molecular weight of a styrene-based resin is preferably about 200,000 to 400,000. If the amount exceeds 0.9 part by weight, only a molecular weight lower than that molecular weight is obtained in many cases.

Finally, by impregnating styrene-modified polyolefin-based resin particles during polymerization or after completion of polymerization with an easily volatile blowing agent, expandable resin particles can be obtained.

As the easily volatile blowing agent, hydrocarbons such as propane, butane, isobutene, pentane, isopentane, cyclopentane and hexane, or fluorinated hydrocarbons such as HCFC-142b, HFC-134a, and HCFC-123 can be used alone or by mixing two or more of them. An amount of the blowing agent to be used is determined by an intended expansion factor of a molded article, and 10 to 30 parts by weight relative to 100 parts by weight of styrene-modified polyolefin-based resin particles is preferable.

Further, in order to easily perform expansion and molding of expandable styrene-modified polyolefin-based resin particles, a co-blowing agent such as toluene, cyclohexane or ethylbenzene can be used. The co-blowing agent is preferably 2% by weight or less relative to 100 parts by weight of the styrene-modified polyolefin-based resin particles.

By mixing the expandable resin particles obtained as described above with a surfactant under pressure, the expandable styrene-modified olefin-based resin particles of the present invention can be obtained.

Examples of the surfactant which can be used in the present invention include noionic surfactants such as polyoxyethylenealkylamine, polyethylene glycol fatty acid ester, alkyldiethanolamide, alkyldiethanolamine and polyalkylene glycol derivative; anionic surfactants such as alkyl sulfonate, alkylbenzenesulfonate and alkyl phosphate; cationic surfactants such as aliphatic alkyl quaternary ammonium salt and trialkylbenzylammonium salt; and amphoteric surfactants such as alkylbetaine and alkylimidazoliumbetaine. It is preferable to use a surfactant having a total carbon number in a range from 5 to 20; however the range of the carbon number changes depending on a kind of the surfactant.

In particular, it is preferable to use a surfactant dissolved in water or an aqueous medium in that the surfactant can be uniformly adhered to surfaces of expandable resin particles in a short time. Examples of such the surfactant include the aliphatic alkyl quaternary ammonium salt, sodium alkylbenzenesulfonate and laurylbetaine. A concentration of dissolution is preferably 15 to 75% by weight. If the concentration of dissolution is less than 15% by weight, the effect of impregnating the surfaces of the expandable resin particles with an antistatic agent is deteriorated; in contrast, if the concentration exceeds 75% by weight, a viscosity is increased and it becomes difficult to uniformly adhere the surfactant to the surfaces of the expandable resin particles in a short time. Herein, the aqueous medium means water, a mixed medium of water and a water-soluble solvent (e.g., lower alcohol), or the like.

In addition, the cationic surfactant is preferable in that excellent antistatic property and flowability of expandable resin particles are not deteriorated and it does not adversely influence on filling property at molding. In particular, the aliphatic alkyl quaternary ammonium salt is preferable. The aliphatic alkyl quaternary ammonium salt can be represented by the following general formula (1):

$$[(R1)_4]^+ C_2H_5OSO_3^- \qquad (1)$$

In the general formula (1), R1s are the same or different, and are preferably an optionally branched alkyl group of a carbon number of 1 to 17. Further, it is preferable that, among four R1s, three are an alkyl group of a carbon number of 1 to 3. In addition, among four R1s, remaining one is preferably an alkyl group of a carbon number of 5 to 20, further preferably a carbon number of 9 to 14, particularly preferably a carbon number of 12. Examples of a particularly preferable aliphatic alkyl quaternary ammonium salt include a salt of the following general formula (2):

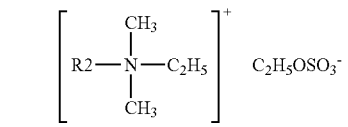

wherein R2 means a straight or branched alkyl group of a carbon number of 5 to 20.

It is preferable that, in the general formula (2), R2 is a straight alkyl group. For example, CATIOGEN ESL made by Dai-ichi Kogyo Seiyaku Co., Ltd. is included in a case where R2 is a straight alkyl group.

In addition, a surfactant which is liquid at a temperature of 10 to 30° C. is preferable in that, even when not dissolved in the aqueous medium, the surfactant can be uniformly adhered to the surfaces of the expandable resin particles in a short time. Examples of such a surfactant include polyoxyethylenelaurylamine, polyoxyethylene oleyl ether and polyoxyethylene glycol monooleate.

An addition amount of the surfactant is 0.1 to 2.0 parts by weight, preferably 0.5 to 1.5 parts by weight relative to 100 parts by weight of the expandable resin particles. The amount of less than 0.1 parts by weight is not preferable, since a desired electrostatic property can not be imparted to expandable styrene-modified olefin-based resin particles, pre-expanded particles and an expanded molded article. In contrast, the amount of more than 2.0 parts by weight is not preferable, since expandable styrene-modified olefin-based particles and pre-expanded particles are sticky, therefore handling becomes difficult. Further, it becomes difficult to fill pre-expanded particles into a molding mold, the resulting expanded molded article is sticky and, conversely, dust is easily adhered thereto, being not preferable.

Impregnation of the surfactant is performed under pressure. Specifically, impregnation is performed under an impregnation temperature of 10 to 30° C. and an impregnation pressure of 0.05 to 0.30 MPa. A more preferable impregnation temperature is 15 to 25° C. and a more preferable impregnation pressure is 0.10 to 0.25 MPa.

If the impregnation temperature is less than 10° C. and the impregnation pressure is less than 0.05 MPa, permeation of the surfactant into the surfaces of the expandable resin particles is worse and sufficient antistatic property is not obtained at a cross-section of an expanded molded article. In contrast, if the impregnation temperature exceeds 30° C. and the impregnation pressure exceeds 0.03 MPa, a rate of permeating the surfactant into the expandable resin particles is high, therefore, if the amount of the surfactant is small, sufficient electrostatic property at a surface of the expanded molded article can not be obtained.

An apparatus which can be used for mixing the expandable resin particles and the surfactant is not particularly limited, but examples thereof include a hermetic-type rotary mixer.

The expandable styrene-modified olefin-based resin particles obtained as described above can be formulated into pre-expanded particles by pre-expansion to a predetermined density by the known method (e.g., heating with water steam having a gauge pressure of 0.01 to 0.10 MPa).

Further, the pre-expanded particles are filled into a mold, and this is heated to thermally fuse the pre-expanded particles by reheating, thereby, the expanded molded particle can be obtained. As a heating medium, water steam at a gauge pressure of 0.05 to 0.15 MPa is suitably used. A density of the expanded molded article is preferably 12 to 200 kg/m³. The density of lower than 12 kg/m³ is not preferable, since a sufficient strength is not obtained; in contrast, the density of higher than 200 kg/m³ is not preferable, since lightening can not be achieved.

The expanded molded article of the present invention can be used in various utilities and, particularly, can be suitably used in a goods-delivery box of a mechanical part such as an automobile part, or a buffering packaging material of an electric product.

EXAMPLES

Hereinafter, the present invention will be described by way of Examples; however, the present invention is not limited thereto.
(Measurement of Bulk Factor)

A bulk factor of expanded particles was obtained by the following equation according to JIS K 6767.

$$A(\text{times}) = (V/W) \times \rho$$

A: bulk factor
V: bulk volume of expanded particles (cm³)
W: weight of expanded particles (g)
ρ: density of polyolefin-based resin (g/cm³)
(Measurement of Surface Specific Resistance)

An expanded molded article is allowed to stand in a constant temperature constant humidity chamber at a temperature of 20° C. and a humidity of 65% for 3 days or longer, and a surface specific resistance of each of an expanded molded article surface (a) and an expanded molded article cross-section (b) is measured. Further, the expanded molded article surface is washed with pure water at an amount of 100 ml/sec for 1 minute thorough a faucet having a diameter of 1 cm, thereafter, a moisture attached to the expanded molded article surface is removed with a towel paper, this is allowed to stand in a constant temperature constant humidity chamber at a temperature of 20° C. and a humidity of 65% for 3 days or longer, and a surface specific resistance of a washed expanded molded article surface (c) is measured. The surface specific resistance is measured using a super insulation meter, SM-10E, manufactured by TOA Corp. according to JIS K 6911. In all of (a), (b) and (c), if the surface specific resistance is $1 \times 10^{12} \Omega$ or less, it is determined that the expanded molded article has antistatic property.
(Measurement of Molecular Weight)

Preparation of sample: 50 mg of styrene-modified polystyrene-based resin particles was divided into two with a cutter knife along with a central line, this is immersed in 10 ml of THF at 20° C. for 24 hours to dissolve a styrene component in THF, and this THF solution is used as a measurement sample.

An average molecular weight (Mw) of a polymer was measured by GPC (Gel Permeation Chromatography) under the following conditions.

Measuring apparatus: High speed GPC apparatus, HLC-8020, manufactured by Tosoh Corp.
Column: HSG-60S×2
HSG-40H×1
HSG-20H×1, manufactured by Sekisui Fine Chemicals Co., Ltd.
Measurement conditions: Column temperature: 40° C.
Mobile phase: THF (tetrahydrofuran)
Flow rate: 1.0 ml/min
Injection amount: 500 ml
Detector: RID-6A manufactured by Tosoh Corp.

Measurement of molecular weight of sample: Upon measurement of the molecular weight of the sample, the measurement condition was selected so that a molecular weight distribution possessed by the sample is included in such a range that a logarithm of a molecular weight of a calibration line prepared by several kinds of monodisperse polystyrene standard samples and count number are linear. In the preset invention, a calibration line for polystyrene was prepared using six polystyrene standard samples (TSK standard polystyrene), made by Tosoh Corp., having weight average molecular weights of $2.74 \times 10^3$, $1.91 \times 10^4$, $1.02 \times 10^5$, $3.55 \times 10^5$, $2.89 \times 10^6$ and $4.48 \times 10^6$, respectively.

Example 1

45 kg of pure water, 300 g of magnesium pyrophosphate as a dispersant, and 50 g of sodium dodecylbenzenesulfonate (25% aqueous solution) were added to an autoclave having an internal volume of 100 liters to obtain an aqueous medium.

Then, vinyl acetate 5%-containing polyethyrene (NOVATEC EVA LV 121 made by Japan Polyethylene Corp.) was formulated into particles having an average bead diameter of 1 mm using an extruder.

12 kg of the particles was suspended in the aqueous medium, a solution in which 85 g of dicumyl peroxide, 40 g of benzoyl peroxide and 4 g of t-butylperoxide were dissolved in 23 kg of styrene was gradually added, and polymerization was performed at 90° C. for 4 hours. Thereafter, a temperature was raised to 140° C., and was retained at the same temperature for 2 hours.

After cooled to a normal temperature, a content was taken out by separating from water, and a dispersant was removed by water washing to obtain styrene-modified polyethylene-based resin particles (molecular weight: about 300,000) consisting of 100 parts by weight of polyethylene and 202 parts by weight of polystyrene.

To a V-type blender 1 shown in FIG. 1, which has an internal volume of 50 liters, is pressure resistant and can be sealed, was added 15 kg of the styrene-modified polyethylene-based resin particles, and this was sealed and stirred. Next, 2 kg of butane (volume ratio of isobutene:normal butane is 3:7) was weighed into a pressure-resistance container 2 connected to the V-type blender 1, and pressed therein by nitrogen pressure. Then, an internal temperature of the V-type blender was maintained at 70° C. for 4 hours, and was cooled to 15° C. Thereafter, 150 g of an aqueous solution of an aliphatic alkyl quaternary ammonium salt (CATIOGEN ESL made by Dai-ichi Kogyo Seiyaku Co., Ltd.: including a salt in which, in the general formula (2), R2 is an alkyl group of —$(CH_2)_{11}CH_3$, concentration: 50%) was placed into the pressure-resistant container 2, and pressed into the V-type blender 1 by nitrogen pressure. Next, stirring was performed for 30 minutes under the conditions of an internal temperature and an internal pressure of the V-type blender of 15° C. and 0.17 Mpa, respectively, and the expandable resin particles were taken out.

In FIG. 1, 3 denotes an blowing agent retaining container, 4 denotes a surfactant charging port, 5 denotes a thermometer, 6 denotes a manometer, 7 denotes a pressure-releasing bulb, 8 denotes a bead charging and taking out port, 9 denotes a warm water or cold water inlet, 10 denotes a warm water or cold water outlet, and 11 denotes a rotating direction of a stirrer of the V-type blender.

The resulting expandable resin particles were immediately placed into a batch expanding machine, pre-expanded to a bulk factor of 20 with water steam having a gauge pressure of 0.03 MPa, to obtain pre-expanded particles and, thereafter, which was stored at room temperature for 24 hours.

Then, the pre-expanded particles were filled into a 400×300×100 mm mold of a molding machine, water steam having a gauge pressure of 0.08 MPa was injected for 60 seconds, and this was expanded by heating. After cooled for 5 minutes, an expanded molded article was taken out.

A kind, amount, addition time and mixing condition of the surfactant and a surface specific resistance of the expanded molded article are shown in Table 1.

Example 2

According to the same manner as that of Example 1 except that an aqueous solution of an aliphatic alkyl quaternary ammonium salt was 225 g, an expanded molded article was obtained. A kind, amount, addition time and mixing condition of a surfactant and a surface specific resistance of the expanded molded article are shown in Table 1.

Example 3

According to the same manner as that of Example 1 except that an aqueous solution of an aliphatic alkyl quaternary ammonium salt was 450 g, an expanded molded article was obtained. A kind, amount, addition time and mixing condition of a surfactant and a surface specific resistance of the expanded molded article are shown in Table 1.

Example 4

According to the same manner as that of Example 1 except that 150 g of polyoxyethylenelaurylamine (ELEGAN S-100 made by NOF Corp.) which is a yellow liquid at a normal temperature (25° C.) was used in place of an aqueous solution of an aliphatic alkyl quaternary ammonium salt, an expanded molded article was obtained. A kind, amount, addition time and mixing condition of a surfactant and a surface specific resistance of the expanded molded article are shown in Table 1.

Example 5

According to the same manner as that of Example 1 except that 600 g of sodium dodecylbenzenesulfonate (25% aqueous solution, NEOPELEX F-25 made by Kao Corp.) which is a yellow transparent viscous liquid at a normal temperature (25° C.) was used in place of an aqueous solution of an aliphatic alkyl quaternary ammonium salt, an expanded molded article was obtained. A kind, amount, addition time and mixing condition of a surfactant and a surface specific resistance of the expanded molded article are shown in Table 1.

Example 6

According to the same manner as that of Example 1 except that 484 g of laurylbetaine (31% aqueous solution, ANHYTOL 20 BS made by Kao Corp.) which is a pale yellow liquid at a normal temperature (25° C.) was used in place of an aqueous solution of an aliphatic alkyl quaternary ammonium salt, an expanded molded article was obtained. A kind, amount, addition time and mixing condition of a surfactant and a surface specific resistance of the expanded molded article are shown in Table 1.

Example 7

According to the same manner as that of Example 1 except that an aqueous solution of an aliphatic alkyl quaternary ammonium salt was 300 g, an expanded molded article was obtained. A kind, amount, addition time and mixing condition of a surfactant and a surface specific resistance of the expanded molded article are shown in Table 1.

Example 8

To the same V-type blender 1 as that of Example 1 shown in FIG. 1, which has an internal volume of 50 liters, is pressure resistant and can be sealed, was added 15 kg of the styrene-modified polyethylene-based resin particles obtained in Example 1, the blender was sealed, and particles were stirred. Next, 2 kg of butane (ratio of isobutene normal butane is 3:7) was weighed into the pressure-resistant container 2 connected to the V-type blender 1, and pressed under nitrogen-pressure. An internal temperature of the V-type blender was maintained at 70° C. for 4 hours, and this was cooled to 25° C. Thereafter, 300 g of an aqueous solution of an aliphatic alkyl quaternary ammonium salt (same in Example 1) was placed into the pressure-resistant container, and was pressed into the V-type blender 1 under nitrogen pressure. Then, stirring was performed for 30 minutes under the condition of the internal temperature and an internal pressure of the V-type blender of 25° C. and 0.25 MPa, respectively, and expandable resin particles were taken out.

Next, pre-expanded particles and an expanded molded article were obtained as in Example 1.

A kind, amount, addition time and mixing condition of a surfactant and a surface specific resistance of the expanded molded article are shown in Table 1.

Example 9

To the same V-type blender 1 as that of Example 1 shown in FIG. 1, which has an internal volume of 50 liters, is pressure-resistant and can be sealed, was added 15 kg of the styrene-modified polyethylene-based resin particles obtained in Example 1, the blender was sealed, and the particles were stirred. Next, 2 kg of butane (ratio of isobutene:normal butane is 3:7) was weighed into the pressure resistant container 2 connected to the V-type blender 1, and pressed under nitrogen-pressure. Then, an internal temperature of the V-type blender was maintained at 70° C. for 4 hours, and was cooled to 12° C. Thereafter, 300 g of an aqueous solution of an aliphatic alkyl quaternary ammonium salt (same in Example 1) was placed into the pressure resistant container, and was pressed into the V-type blender 1 under nitrogen pressure. Next, stirring was performed for 30 minutes under the condition of the internal temperature and an internal pressure of the V-type blender of 12° C. and 0.10 MPa, respectively, and expandable resin particles were taken out.

Next, pre-expanded particles and an expanded molded article were obtained as in Example 1.

A kind, amount, addition time and mixing condition of a surfactant and a surface specific resistance of the expanded molded article are shown in Table 1.

Example 10

53 kg of pure water, 280 g of magnesium pyrophosphate as a dispersant, and 50 g of sodium dodecylbenzenesulfonate (same as Example 5) were added to an autoclave having an internal volume of 100 liters, to obtain an aqueous medium. Next, vinyl acetate 5%-containing polyethylene (NOVATEC EVA LV121 made by Japan Polyethylene Corp.) was formulated into particles having an average bead diameter of 1 mm using an extruder.

17 kg of the particles were suspended in the aqueous medium, a solution in which 65 g of dicumyl peroxide, 30 g of benzoyl peroxide and 3.4 g of t-butyl peroxide were dissolved in 17 kg of styrene was gradually added, and polymerization was performed at 90° C. for 3 hours. Thereafter, a temperature was raised to 140° C., and was retained at the same temperature for 2 hours.

After cooled to a normal temperature (25° C.), a content was taken out by separating from water, and a dispersant was removed by water washing, to obtain styrene-modified polyethylene-based resin particles (molecular weight: about 300,000) consisting of 100 parts by weight of polyethylene and 105 parts by weight of polystyrene.

Next, according to the same manner as that of Example 1 except that the styrene-modified polyethylene-based resin particles were used, an expanded molded article was obtained.

A kind, amount, addition time and mixing condition of a surfactant and a surface specific resistance of the expanded molded article are shown in Table 1.

Example 11

40 kg of pure water, 250 g of magnesium pyrophosphate as a dispersant and 60 g of sodium dodecylbenzenesulfonate (same as Example 5) were added to an autoclave having an internal volume of 100 liters, to obtain an aqueous medium. Next, polyethylene (TUF-2032 made by Nippon Unicar Co., Ltd.) was formulated into particles having an average bead diameter of 1 mm using an extruder.

12 kg of the particles were suspended in the aqueous medium, a solution in which 70 g of dicumyl peroxide and 2 g of t-butyl peroxide were dissolved in 28 kg of styrene was gradually added, and polymerization was performed at 100° C. for 4 hours. Thereafter, a temperature was raised to 140° C., and retained at the same temperature for 2 hours.

After cooled to a normal temperature 25° C., a content was taken out by separating from water, and a dispersant was removed by water washing to obtain styrene-modified polyethylene-based resin particles (molecular weight: about 350,000) consisting of 100 parts by weight of polyethylene and 233 by parts by weight of polystyrene.

Next, according to the same manner as that of Example 1 except that the styrene-modified polyethylene-based resin particles were used, an expanded molded article was obtained.

A kind, amount, addition time and mixing condition of a surfactant and a surface specific resistance of the expanded molded article are shown in Table 1.

Example 12

According to the same manner as that of Example 1 except that butane was changed to 1.5 kg of pentane (ratio of isopentane:normal pentane is 2:8), an expanded molded article was obtained.

A kind, amount, addition time and mixing condition of a surfactant and a surface specific resistance of the expanded molded article are shown in Table 1.

Comparative Example 1

To the same V-type blender 1 as that of Example 1, which has an internal volume of 50 liters, is pressure-resistant and can be sealed, were added 15 kg of the styrene-modified polyethylene-based resin particles and 450 g of the aqueous solution of the aliphatic alkyl quaternary ammonium salt which are the same as those of Example 1, the blender was sealed, and 2 kg of butane (ratio of isobutene:normal butane is 3:7) was pressed while stirring. Then, an internal temperature of the V-type blender was maintained at 70° C. for 4 hours, cooled to 15° C., and expandable resin particles were taken out.

Next, pre-expanded particles and an expanded molded article were obtained as in Example 1.

A kind, amount, addition time and mixing condition of a surfactant and a surface specific resistance of the expanded molded article are shown in Table 1.

Comparative Example 2

According to the same manner as that of Example 1 except that an aqueous solution of an aliphatic alkyl quaternary ammonium salt was 24 g, an expanded molded article was obtained. A kind, amount, addition time and mixing condition of a surfactant and a surface specific resistance of the expanded molded article are shown in Table 1.

Comparative Example 3

According to the same manner as that of Example 1 except that an aqueous solution of an aliphatic alkyl quaternary ammonium salt was 900 g, expandable resin particles were obtained. However, since foaming at the time when the expandable resin particles were taken out from the V-type blender was severe, and flowability of pre-expanded particles obtained therefrom was worse, filling into a molding mold became worse, and a better expanded molded article could not be obtained. A kind, amount, addition time and mixing condition of a surfactant are shown in Table 1.

Comparative Example 4

To the same V-type blender 1 as that of Example 1, which has an internal volume of 50 liters, is pressure resistance and can be sealed, was added 15 kg of the styrene-modified polyethylene-based resin particles as in Example 1, the blender was sealed, and the particles were stirred. Next, 2 kg of butane (ratio of isobutene:normal butane is 3:7) was weighed in the pressure resistant container 2 connected to the V-type blender 1, and pressed under nitrogen pressure. Then, an internal temperature of the V-type blender was maintained at 70° C. for 4 hours, and was cooled to 30° C. Thereafter, 150 g of an aqueous solution of an aliphatic alkyl quaternary ammonium salt (same as Example 1) was placed into a pressure resistant contained and placed into the V-type blender 1 under nitrogen pressure. Next, stirring was performed for 30 minutes under the condition of the internal temperature and an internal pressure of the V-type blender of 30° C. and 0.35 MPa, respectively, and expandable resin particles were taken out.

Then, pre-expanded particles and an expanded molded article were obtained as in Example 1.

A kind, amount, addition time and mixing condition of a surfactant and a surface specific resistance of the expanded molded article are shown in Table 1.

Comparative Example 5

To the same V-type blender 1 as that of Example 1, which has an internal volume of 50 liters, is pressure-resistant and can be sealed, was added 15 kg of the styrene-modified polyethylene-based resin particles as in Example 1, the blender was sealed, and the material was stirred. Next, 2 kg of butane (ratio of isobutane:normal butane is 3:7) was weighed in the pressure resistant container 2 connected to the V-type blender, and pressed under nitrogen pressure. Then, an internal temperature of a V-type blender was maintained at 70° C. for 4 hours, and cooled to at 35° C. Thereafter, the pressure-releasing valve 3 was opened to an internal pressure of 0 MPa (atmospheric pressure). Then, 150 g of an aqueous solution of an aliphatic alkyl quaternary ammonium salt (same as Example 1) was placed in the V-type blender 1 while the pressure releasing valve 7 was opened. Next, stirring was performed for 30 minutes under the internal temperature and the internal pressure of the V-type blender of 35° C. and 0 MPa, respectively, and expandable resin particles were taken out.

Next, pre-expanded particles and an expanded molded article were obtained as in Example 1.

A kind, amount, addition time and mixing condition of a surfactant and a surface specific resistance of the expanded molded article are shown in Table 1.

Comparative Example 6

To the same V-type blender 1 as that of Example 1, which has an internal volume of 50 liters, is pressure resistant and can be sealed, was added 15 kg of the styrene-modified polyethylene-based resin particles as in Example 1, the blender was sealed, and the material was stirred. Next, 2 kg of butane (ratio of isobutane:normal butane is 3:7) was weighed in the pressure-resistant container 2 connected to the V-type blender 1, and was pressed under nitrogen pressure. Then, an internal temperature of the V-type blender was maintained at 70° C. for 4 hours, and cooled to 15° C. Thereafter, the pressure-releasing valve 7 was opened to an internal pressure of 0 MPa (atmospheric pressure). Then, 150 g of an aqueous solution of an aliphatic alkyl quaternary ammonium salt (same as Example 1) was placed into the V-type blender 1 while the pressure-releasing valve 7 was opened. Next, stirring was performed for 30 minutes under the condition of the internal temperature and the internal pressure of the V-type blender of 15° C. and 0 MPa, respectively, and expandable resin particles were taken out.

Next, pre-expanded particles and an expanded molded article were obtained as in Example 1.

A kind, amount, addition time and mixing condition of a surfactant and a surface specific resistance of the expanded molded article are shown in Table 1.

Comparative Example 7

To the same V-type blender 1 as that of Example 1, which has an internal volume of 50 liters, is pressure-resistant and can be sealed, was added 15 kg of the styrene-modified polyethylene-based resin particles as in Example 1, the blender was sealed, and the material was stirred. Next, 2 kg of butane (ratio of isobutane:normal butane is 3:7) was weighed in the pressure-resistant container 2 connected to the V-type blender 1, and pressed therein under nitrogen pressure. Then, an internal temperature of the V-type blender was maintained at 70° C. for 4 hours, and cooled to 5° C. Thereafter, 150 g of an aqueous solution of an aliphatic alkyl quaternary ammonium salt (same as Example 1) was placed into the pressure-resistant container, and placed into the V-type blender 1 under nitrogen pressure. Next, stirring was performed for 30 minutes under the condition of the internal temperature and an internal pressure of the V-type blender of 5° C. and 0.06 MPa, respectively, and expanded resin particles were taken out.

Next, pre-expanded particles and an expanded molding article were obtained as in Example 1.

A kind, amount, addition time and mixing condition of a surfactant and a surface specific resistance of the expanded molded article are shown in Table 1.

TABLE 1

| | kind of styrene-modified polyethylene-based resin beads | blowing agent kind | blowing agent amount (parts by weight) | surfactant kind | surfactant amount (parts by weight) |
|---|---|---|---|---|---|
| Ex. 1 | a | butane | 13.3 | aliphatic alkyl quaternary ammonium salt | 0.5 |
| Ex. 2 | a | butane | 13.3 | aliphatic alkyl quaternary ammonium salt | 0.75 |
| Ex. 3 | a | butane | 13.3 | aliphatic alkyl quaternary ammonium salt | 1.5 |
| Ex. 4 | a | butane | 13.3 | polyoxyethylenelaurylamine | 1.0 |
| Ex. 5 | a | butane | 13.3 | sodium dodecylbenzensulfonate | 1.0 |
| Ex. 6 | a | butane | 13.3 | laurylbetaine | 1.0 |
| Ex. 7 | a | butane | 13.3 | aliphatic alkyl quaternary ammonium salt | 1.0 |
| Ex. 8 | a | butane | 13.3 | aliphatic alkyl quaternary ammonium salt | 1.0 |
| Ex. 9 | a | butane | 13.3 | aliphatic alkyl quaternary ammonium salt | 1.0 |
| Ex. 10 | b | butane | 13.3 | aliphatic alkyl quaternary ammonium salt | 0.5 |
| Ex. 11 | c | butane | 13.3 | aliphatic alkyl quaternary ammonium salt | 0.5 |
| Ex. 12 | a | pentane | 10.0 | aliphatic alkyl quaternary ammonium salt | 0.5 |
| Com. Ex. 1 | a | butane | 13.3 | aliphatic alkyl quaternary ammonium salt | 1.5 |
| Com. Ex. 2 | a | butane | 13.3 | aliphatic alkyl quaternary ammonium salt | 0.08 |
| Com. Ex. 3 | a | butane | 13.3 | aliphatic alkyl quaternary ammonium salt | 3.0 |
| Com. Ex. 4 | a | butane | 13.3 | aliphatic alkyl | 0.5 |

TABLE 1-continued

| | | | | quaternary ammonium salt | |
|---|---|---|---|---|---|
| Com. Ex. 5 | a | butane | 13.3 | aliphatic alkyl quaternary ammonium salt | 0.5 |
| Com. Ex. 6 | a | butane | 13.3 | aliphatic alkyl quaternary ammonium salt | 0.5 |
| Com. Ex. 7 | a | butane | 13.3 | aliphatic alkyl quaternary ammonium salt | 0.5 |

| | surfactant | | surface specific resistance($\Omega$) | | |
|---|---|---|---|---|---|
| | | | molded article surface | molded article cross-section | washed molded article surface |
| | addition time | mixing condition | (a) | (b) | (c) |
| Ex. 1 | after impregnating | 15° C. 0.17 MPa | $2 \times 10^{11}$ | $5 \times 10^{11}$ | $5 \times 10^{11}$ |
| Ex. 2 | after impregnating | 15° C. 0.17 MPa | $1 \times 10^{10}$ | $1 \times 10^{10}$ | $1 \times 10^{11}$ |
| Ex. 3 | after impregnating | 15° C. 0.17 MPa | $1 \times 10^{10}$ | $1 \times 10^{10}$ | $1 \times 10^{11}$ |
| Ex. 4 | after impregnating | 15° C. 0.17 MPa | $1 \times 10^{11}$ | $3 \times 10^{11}$ | $4 \times 10^{11}$ |
| Ex. 5 | after impregnating | 15° C. 0.17 MPa | $1 \times 10^{11}$ | $1 \times 10^{11}$ | $5 \times 10^{11}$ |
| Ex. 6 | after impregnating | 15° C. 0.17 MPa | $2 \times 10^{11}$ | $4 \times 10^{11}$ | $6 \times 10^{11}$ |
| Ex. 7 | after impregnating | 15° C. 0.17 MPa | $1 \times 10^{10}$ | $1 \times 10^{10}$ | $1 \times 10^{11}$ |
| Ex. 8 | after impregnating | 25° C. 0.25 MPa | $1 \times 10^{10}$ | $1 \times 10^{10}$ | $3 \times 10^{11}$ |
| Ex. 9 | after impregnating | 12° C. 0.10 MPa | $1 \times 10^{10}$ | $1 \times 10^{11}$ | $1 \times 10^{11}$ |
| Ex. 10 | after impregnating | 15° C. 0.17 MPa | $2 \times 10^{11}$ | $3 \times 10^{11}$ | $5 \times 10^{11}$ |
| Ex. 11 | after impregnating | 15° C. 0.17 MPa | $1 \times 10^{11}$ | $5 \times 10^{11}$ | $5 \times 10^{11}$ |
| Ex. 12 | after impregnating | 15° C. 0.17 MPa | $1 \times 10^{11}$ | $5 \times 10^{11}$ | $5 \times 10^{11}$ |
| Com. Ex. 1 | before impregnating | — | $1 \times 10^{13}$ | $1 \times 10^{13}$ | $1 \times 10^{13}$ |
| Com. Ex. 2 | after impregnating | 15° C. 0.17 MPa | $3 \times 10^{12}$ | $1 \times 10^{13}$ | $3 \times 10^{13}$ |
| Com. Ex. 3 | after impregnating | 15° C. 0.17 MPa | | * | |
| Com. Ex. 4 | after impregnating | 30° C. 0.35 MPa | $1 \times 10^{13}$ | $1 \times 10^{11}$ | $3 \times 10^{13}$ |
| Com. Ex. 5 | after impregnating | 35° C. 0 MPa | $1 \times 10^{12}$ | $1 \times 10^{11}$ | $1 \times 10^{14}$ |
| Com. Ex. 6 | after impregnating | 15° C. 0 MPa | $1 \times 10^{10}$ | $1 \times 10^{14}$ | $1 \times 10^{14}$ |
| Com. Ex. 7 | after impregnating | 5° C. 0.06 MPa | $1 \times 10^{10}$ | $1 \times 10^{14}$ | $1 \times 10^{15}$ |

In Table 1, a, b, c, butane, pentane and * mean the following contents.

a: styrene-modified polyethylene-based resin particles (molecular weight: about 300,000) consisting of 100 parts by weight of polyethylene and 202 parts by weight of polystyrene described in Example 1 b: styrene-modified polyethylene-based resin particles (molecular weight: about 300,000) consisting of 100 parts by weight of polyethylene and 105 parts by weight of polystyrene described in Example 10 c: styrene-modified polyethylene-based resin particles (molecular weight: about 350,000) consisting of 100 parts by weight of polyethylene and 233 parts by weight of polystyrene described in Example 11

Butane:volume ratio of isobutane:normal butane of 3:7

Pentane:volume ratio of isopentane:normal pentane of 2:8

*: foaming at extraction from a reactor is severe, flowability of pre-expanded particles is worse, and filling is worse; therefore, molding is impossible.

From Example 1 and Comparative Examples 4 to 7, by impregnating expandable resin particles with the surfactant under the temperature and pressure condition in a range of the present invention, the expanded molded article having an excellent surface specific resistance can be obtained.

From Example 3 and Comparative Example 1, by impregnating with the surfactant after impregnation with the blowing agent, the expanded molded article having an excellent surface specific resistance can be obtained.

From Examples 1 to 12 and Comparative Examples 2 and 3, by rendering an amount of the surfactant to be used in a range of the present invention, the expanded molded article having an excellent surface specific resistance can be obtained.

As described above, according to the present invention, by impregnating styrene-modified olefin-based resin particles with the easily volatile blowing agent to obtain expandable resin particles, and impregnating the expandable resin particles with the surfactant under particular condition, expandable styrene-modified olefin-based resin particles excellent in antistatic property can be obtained without using resin particles copolymerized with the expensive hydrophilic monomer. The method of the present invention is an easy production method, and is economical.

In addition, in the expanded molded article obtained from the expanded styrene-modified olefin-based resin particles, since the surfactant is contained not only in surfaces thereof, but also in interiors thereof, antistatic property is possessed even when cracking, breakage or water-washing occurs. For this reason, the article can be used in the package material of the electronic part such as the liquid crystal display.

What is claimed is:

1. A method for producing expandable styrene-modified olefin-based resin particles comprising steps of:
    impregnating styrene-modified olefin-based resin particles with an easily volatile blowing agent to obtain expandable resin particles, and
    impregnating 100 parts by weight of the expandable resin particles with 0.1 to 2.0 parts by weight of a surfactant at a temperature of 10 to 30° C. and an internal pressure of 0.05 to 0.30 MPa, to obtain expandable styrene-modified olefin-based resin particles, wherein the surfactant is represented by the following general formula (1):

    $[(R1)_4N]^+C_2H_5OSO_3^-$, and R1 is the same or different, and optionally branched alkyl group of a carbon number of 1 to 17;
    where the styrene-modified olefin-based resin particles comprise a polyolefin-based resin and a polystyrene-based resin, the polyolefin-based resin being selected from a low-density polyethylene, a medium-density polyethylene, a high-density polyethylene, a linear low-density polyethylene, an ethylene-vinyl acetate copolymer, a polypropylene, a propylene-ethylene copolymer, and a propylene-1-butene copolymer.

2. The method for producing expandable particles of claim 1, wherein the surfactant is dissolved in an aqueous medium.

3. The method for producing expandable particles of claim 1, wherein the surfactant is a cationic surfactant.

4. The method for producing expandable particles of claim 1, wherein the surfactant is liquid at a temperature of 10 to 30° C.

5. A method for producing pre-expanded particles comprising step of:
pre-expanding the expandable styrene-modified olefin-based resin particles obtained by the method of claim 1 by heating with water steam at a gauge pressure of 0.01 to 0.10 MPa, to obtain pre-expanded particles.

6. A method for producing expanded molded particles comprising step of:
expanding-molding the pre-expanded particles obtained by the method of claim 5 by heating with water steam at a gauge pressure of 0.05 to 0.15 MPa, to obtain an expanded molded article.

7. The method for producing expandable particles of claim 1, wherein the surfactant has a total number of carbon atoms of least 5.

8. The method for producing expandable particles of claim 1, wherein the surfactant is represented by the following general formula:

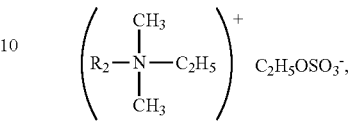

wherein R2 is a straight or branched alkyl group having a carbon number of 5 to 20.

9. The method for producing expandable particles of claim 1, wherein the surfactant is added to give an antistatic effect to the expandable particles.

* * * * *